United States Patent [19]

Nickel et al.

[11] Patent Number: 5,425,179
[45] Date of Patent: Jun. 20, 1995

[54] OPTICAL SENSOR FOR MEASURING INCLINATION ANGLES

[75] Inventors: Frank S. Nickel; David R. Payne, both of Perry, Okla.

[73] Assignee: The Charles Machine Works, Inc., Perry, Okla.

[21] Appl. No.: 140,743

[22] Filed: Oct. 22, 1993

[51] Int. Cl.⁶ .................................................. G01C 9/06
[52] U.S. Cl. ........................................ 33/366; 33/377
[58] Field of Search .................... 33/366, 377; 356/249

[56] References Cited

U.S. PATENT DOCUMENTS

| | | | |
|---|---|---|---|
| 3,442,023 | 5/1969 | Remington | 33/206 |
| 3,464,276 | 9/1969 | Leibert | 33/377 |
| 4,028,815 | 7/1977 | Buckley et al. | 33/366 |
| 4,244,117 | 1/1981 | Cantarella et al. | 33/366 |
| 4,307,516 | 12/1981 | Walker | 33/366 |
| 4,332,090 | 6/1982 | Bailey et al. | 33/366 |
| 4,438,820 | 3/1984 | Gibson | 33/377 |
| 4,521,973 | 6/1985 | Wiklund et al. | 33/366 |
| 4,644,662 | 2/1987 | Anderson et al. | 33/366 |
| 4,666,299 | 5/1987 | Tamaki et al. | 33/377 |
| 4,779,353 | 10/1988 | Lopes et al. | 33/366 |
| 4,811,491 | 3/1989 | Phillips et al. | 33/366 |
| 4,993,162 | 2/1991 | Scholian | 33/377 |
| 5,128,867 | 7/1992 | Helm | 364/422 |

FOREIGN PATENT DOCUMENTS

| | | | |
|---|---|---|---|
| 0247970 | 7/1987 | Germany | 33/377 |
| 0000316 | 1/1985 | Japan | 33/366 |
| 0128414 | 5/1991 | Japan | 33/377 |
| 4002910 | 1/1992 | Japan | 33/366 |
| 2110374 | 6/1983 | United Kingdom . | |
| 2113383 | 8/1983 | United Kingdom | 33/366 |
| 1150352 | 4/1985 | U.S.S.R. . | |

Primary Examiner—Thomas B. Will
Attorney, Agent, or Firm—Richards, Medlock & Andrews

[57] ABSTRACT

A device utilized for accurately measuring inclination angles independent of roll position using optical methods, whereby an amplitude of reflected (or refracted) light rays from a surface of a gravity-leveled liquid are detected by a photo-detector. The amplitude of the detected light beam is a function of the beam's angle of incidence to the liquid, which is proportional to the angle of the sensor's inclination. The incline sensor includes a cylindrical symmetric vessel which is partially filled with a liquid, an axially symmetric light emitting diode (LED) and a photo-detector. The fluid is chosen to have indices of refraction of at least 1.33, or reflectivity >0.60 so that measurable refraction (or reflection) angles can be realized for the geometry of the sensor. The liquid is also chosen to have freezing and boiling points acceptable for use in the desired applications.

25 Claims, 3 Drawing Sheets

OPTICAL SENSOR FOR MEASURING INCLINATION ANGLES

TECHNICAL FIELD OF THE INVENTION

The present invention generally relates to a fluid filled sensor used for the measurements of inclination (also known as pitch or tilt) in the presence of a gravitational field, and more particularly to an optical sensor for determining the inclination angle independent of the roll position of the sensor.

BACKGROUND OF THE INVENTION

The emergence of trenchless technology has created a necessity for knowing real-time orientation/positional information from an underground drill toolhead. During guided underground boring operations, the toolhead's depth, roll position, and inclination is required in order to navigate the boring tool through the soil, around and under objects.

Prior art inclination sensors utilize several different angle measuring methods, including mechanical (pendulum or "gravity-seeking"), resistive (electrolytic fluid based) capacitive (dielectric fluid based), as well as gravity (accelerometer) based techniques. Typically, prior art inclinometers using mechanical, resistive, capacitive, or accelerometer based sensors are single axis devices and cannot provide inclination information independent of roll position. The inventions described in U.S. Pat. Nos. 4,028,815, 3,442,023, and 4,244,117 are based on either electrolytic fluid or conductive fluid resistive techniques and must be oriented at a specific roll position to function properly. U.S. Pat. No. 4,779,353 and U.K. Pat. No. 2110374A also use fluid-resistive techniques, but are, however, independent of roll. U.S. Pat. Nos. 4,644,662 and 4,521,973 use a capacitive/dielectric fluid based method and are not independent of roll, but U.S. Pat. No. 4,811,491 describes a two-axis capacitive/dielectric fluid based inclinometer which provides both roll and incline information. U.S. Pat. No. 5,128,867 uses both flux magnetometers and triaxial accelerometers to sense the earth's magnetic and gravitational field in order to provide roll and pitch information simultaneously. None of the prior art sensors described above, nor in references cited within, however, use optical/fluid based reflective/refractive methods for transducing inclination information that is independent of the roll position of the sensor.

SUMMARY OF THE INVENTION

It is therefore an object of the present invention to provide an inclinometer which uses the optical properties of a liquid to accurately provide inclination information independent of roll. It is also another object of the present invention to provide an optical inclinometer that can be used in both a horizontal (reflective) as well as in a vertical (refractive) mode. It is yet another object of the present invention to provide an accurate, high resolution analog optical inclinometer which may be used in either a vertical or a horizontal borehole environment. It is a further object of the present invention to provide an optical, liquid based inclinometer which has no moving parts, other than a contained liquid, requires very low current to operate (<10 mA), and has a fast settling time (<1 μS).

In accordance with the above stated objects of the invention, the optical, liquid-based sensor for measuring an angle of inclination is comprised of:

(a) an opaque vessel partially filled with a liquid having the appropriate optical properties; for being either reflective or refractive of energy incident thereto;

(b) an axially symmetric energy emitter and corresponding energy detector with the refractive or reflective medium therebetween; and (c) a liquid which is chosen to have an index of refraction of at least about 1.33, or a reflectivity greater than about 0.60 so that measurable refraction (or reflection) angles can be detected. The liquid is also chosen to have suitable viscosity and freezing and boiling points acceptable for use in the desired application.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements through the views, and in which.

DETAILED DESCRIPTION OF THE INVENTION

Figure 1:
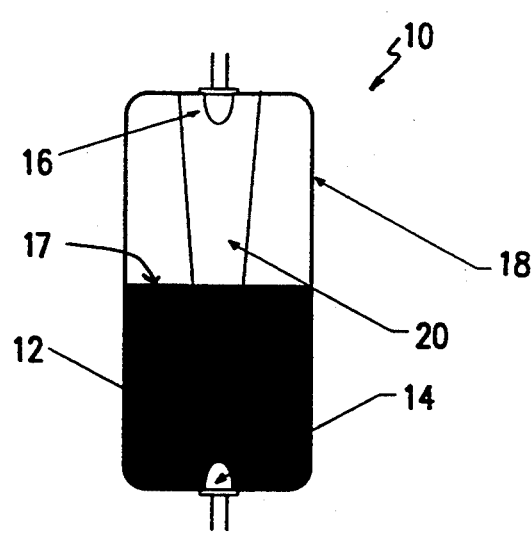
FIG. 1 illustrates an optical pitch sensor according to a preferred embodiment of the invention.

The pitch sensor 10, in one form of the invention, uses the optical refractive properties of a liquid 12 to transduce angles of inclination of the sensor with respect to a reference. The reference is considered to be a plane or axis tangential to the general surface of the earth. In this mode, the sensor 10, when level, is in an "upright" position with the optical emitter 14 on bottom and immersed in the liquid 12, and the optical detector 16 located at the top of the sensor in axial alignment with the emitter 14. FIG. 1 shows a sectional view of this embodiment of the pitch sensor 10 when in a level position. Isopropyl alcohol, which has an index of refraction of about 1.33, is suitable for use as the liquid is in the sensor 10. Other liquids having an index of refraction of greater than about 1.33 can be suitably utilized with the invention. The liquid 12 is preferably contained in an opaque container or vessel 18.

Figure 2:
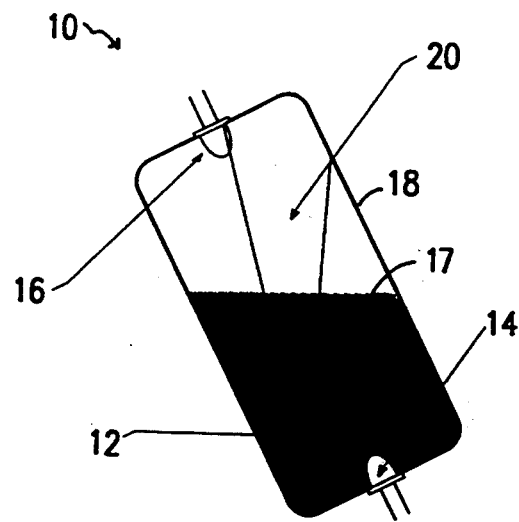
FIG. 2 illustrates the pitch sensor of FIG. 1, but inclined at an angle, whereby the light is refracted at a surface interface of the liquid.
Figure 3:
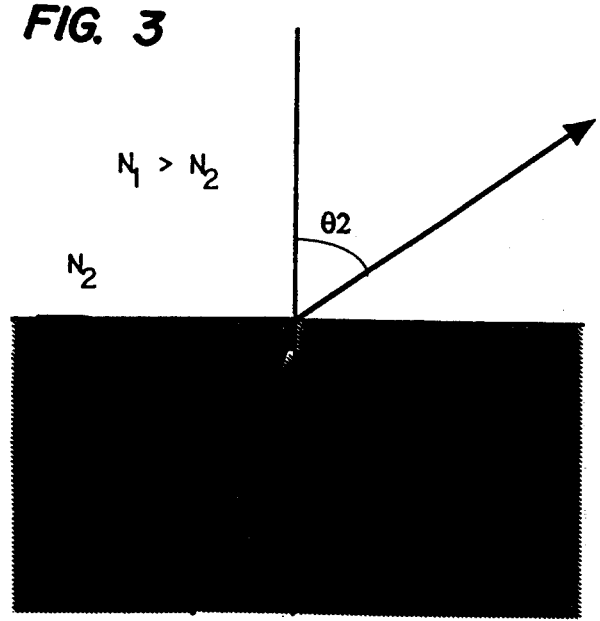
FIG. 3 illustrates the basic principles of light refraction.

The surface 17 of the liquid 12 within the vessel 18, under the influence of gravity, remains level while the vessel 18 is tilted or inclined. The amount of liquid 12 is chosen to fill the vessel 18 about one half the total internal volume of the vessel 18. With no incline (or zero degrees of inclination from a horizontal reference), a beam of energy, such as light 20, originating from the photo-emitter 14 is not significantly refracted by the liquid medium 12 and is detected nearly completely by a photo-detector 16 located at the opposite end of the sensor vessel 18. When the sensor 10 is tilted, the beam of light 20 transmitted from the emitter 14 is refracted away from the detector 16 at varying angles, depending on the inclination of the sensor 10, thus reducing the total illumination of light 20 on the base-collector junction of the detector 16. When the sensor 10 has either a positive or negative angle of inclination, the output amplitude of the photo-detector 16 varies as a function of the inclination angle due to the varying amounts of refraction occurring at the air/fluid boundary interface 17. FIG. 2 illustrates the pitch sensor 10 in a tilted position. The refractive phenomena of light can be readily explained using Snell's law of refraction and reflection at boundaries of materials having different indices of refraction. The following equation describing the dependence of the angles of refraction with respect to the indices of refraction and angle of incidence is:

$$n_1 \sin(\theta_1) = n_2 \sin(\theta_2)$$

where $n_1$ and $n_2$ are the indices of refraction of the fluid and air respectively, and $\theta_1$ and $\theta_2$ are the angles of incidence and refraction, respectively, at the fluid-air interface 17. FIG. 3 depicts this relationship graphically. It is to be noted that the surface tension of the fluid at the sidewall of the vessel 18, which causes a slight negative meniscus, does not hinder the sensor 10 from functioning, but causes the output response of the sensor 10 to be not entirely sinusoidal dependent at the extreme positive and negative angles of inclination.

Figure 4:
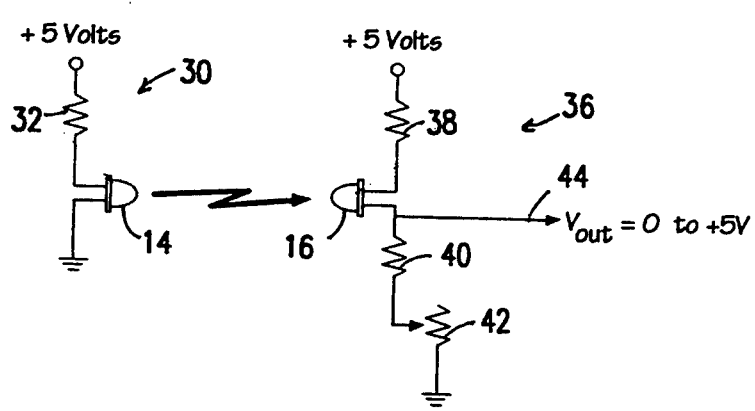
FIG. 4 is a circuit that can be utilized with the light emitter and the light detector of the pitch sensors of the invention.

By using simple external electronic circuits shown in FIG. 4, the change in total illumination of the detector 16 due to the sensor's angular orientation can be easily translated to a measurable voltage level. The light emitter circuit 30 includes a resistor 32 connected in series with the light emitter 14, between a supply voltage and a circuit common. The resistor 32 is selected to provide an appropriate current through the photo-emitter 14 and thus place the emitter device 14 into a desired mode of operation. The photo-detector circuit 36 includes the photo-detector 16 connected by a first resistor 38 to a supply voltage, and a second resistor 40 connected to the movable arm of a potentiometer 42. One end of the potentiometer 42 is connected to circuit common and the other end is open circuited. With this arrangement, the output 44 of the photo-detector circuit 36 can be adjusted to provide an output voltage ranging between the supply voltage and the circuit common, in correspondence with the range of angular inclination of the sensor 10. In the preferred embodiment, the photo-emitter 14 and the photo-detector operate in the infrared spectrum at about 915 nm, and are manufactured for paired operation. Matched photo emitters and detectors manufactured under the name Archer, and type 376-142, operate satisfactorily in the invention. The relatively small base current of the photo-detector, which is a function of the light absorbed within the detector's base region, causes an emitter-collector current to flow through the load resistor 40, which in turn allows a signal voltage to appear across such resistor. The balance potentiometer 42 is used to adjust the output voltage 44 to a mid-scale position when the sensor 10 is level, or at zero degrees of inclination.

In FIG. 2, the sensor 10 is shown tilted from a reference vertical axis (not shown) that extends through the photo-emitter 14 and the photo-detector 16. Because of the pitch or tilt from this reference axis, the light 20 emitted from the photo-emitter 14 is refracted at the surface of the liquid 12 where it interfaces with the air medium. This refraction at the liquid surface 17 of the light 20 farther away from the photo-detector 16 is a direct function of the amplitude of the output 44 of the detector circuit 36. Indeed, the output of the photo-detector 16 is a function of the intensity by which the emitted light 20 is refracted, and thus the extent of light refraction is a function of the angle of inclination of the sensor 10 from the reference. Thus, the amplitude of the output 44 of the photo-detector circuit 36 is a function of the angle of inclination of the sensor 10. While the inclination angle and voltage output of the photo-detector circuit 36 may not be linear, a calibration can be carried out using electrical circuits, such as an analog-to-digital converter, a processor and a look-up table. In other words, for measured angles of inclination of the sensor 10, the respective output voltages 44 of the photo-detector circuit 36 can be correlated to angle data stored in the look-up table. The processor can obtain digitized signals from the output of an analog-to-digital converter, use the digitized signals as a reference to an entry point in the look-up table, and find the pre-stored angle data that corresponds to the entry point. The processor can thus produce output angles of inclination that are correlated to the electrical output of the photo-detector circuit 36.

In the preferred form of the sensor 10, the vessel 18 is constructed of an opaque plastic, such as a Noryl plastic. The plastic vessel 18 can be etched on the inside surface or otherwise treated, painted or coated to reduce internal reflections of light. The light that reaches the photo-detector 16 is that which is refracted from the surface boundary 17 of the liquid 12, and not that which is internally reflected from the internal surface of the vessel 18. The internal surface of the vessel 18 should thus be highly absorptive of the wavelengths of light to which the photo-detector 16 is responsive. The dimensions of the vessel are preferably small, such as one inch high as shown in FIG. 1, and three-eighths inch deep and wide.

In constructing the vessel 18, two opposing holes are formed therein in alignment with the longitudinal axis of the vessel. The photo-detector 16 and the photo-emitter 14 can be adhered or cemented in the holes to provide a sealed container. However, before the last photo-device is cemented in place, a specified volume of liquid 12 having an index of refraction, preferably greater than about 1.33, is poured into the vessel 18. The remaining photo-device can then be glued in the remaining hole of the vessel 18 to seal it. Importantly, the type of liquid utilized and the container material, as well as the case material of the photo-devices 14 and 16, must be compatible and not destructive of such materials. It is noted that the photo-devices identified above have plastic lenses integrated therewith, thus providing a certain degree of focusing of the light beam between the emitter and detector elements.

While mounting apparatus is not shown connected to the vessel 18, those skilled in the art can readily devise of such apparatus for mounting the sensor 10 so that the photo-emitter 14 and photo-detector 16 are aligned and coaxial with a vertical axis of roll of the equipment to which the sensor 10 is attached. As can be appreciated, for a given angle of inclination of the sensor vessel 18, the output of the photo-emitter 16 is independent of the roll orientation 10 of the sensor about a reference axis extending through the photo-devices 14 and 16.

Figure 5:
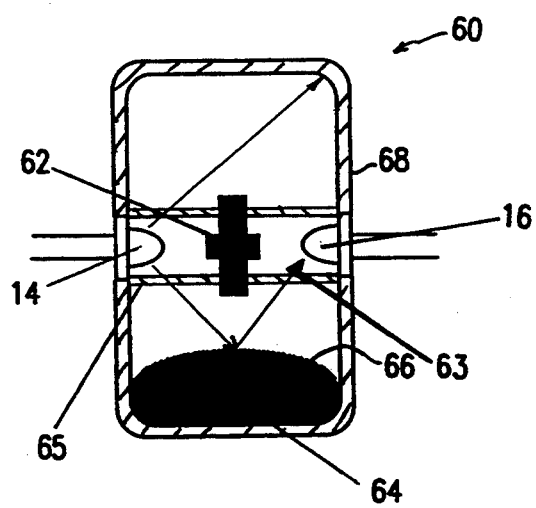
FIG. 5 illustrates another embodiment of the optical pitch sensor of the invention, utilizing reflective properties of the liquid.

An optical inclination sensor 60, according to another embodiment of the invention is shown in FIG. 5. When used in a horizontal-reflective mode, the sensor 60 provides the capability of measuring angles of inclination, again independent of the roll position of the sensor about a horizontal reference axis. When used in this mode, the liquid is chosen to have a reflection coefficient of at least 0.60 so that the reflected beam from the emitter 14 can be easily measured at the photo-detector 16. A fluid 64 such as mercury is suitable for such use with this embodiment of the invention. FIG. 5 shows a cross-sectional view of the optical inclination sensor in a horizontal level position. In this embodiment, an optical mask 62 is used to block direct illumination of light 63 between the emitter 14 and the detector 16. The only light 63 that is "seen" by the detector 16 is that which is reflected from the surface of the liquid 64.

The mask 62 is supported about midway between the photo-emitter 14 and the photo-detector 16 by a transparent rod 65. The support rod 65 is preferably made of a material having an index of refraction close to that of the air medium, also encased in the vessel 68. Nevertheless, if the light 63 exits the support rod 65 at an angle caused by refraction, the angle is constant and does not change with the angle of inclination of the sensor 60. The only angle of light that changes with inclination of the sensor 60 is the angle by which the light emitted from the photo-emitter 14 is reflected from the surface of the liquid 64.

The support rod 65 preferably has a diameter smaller than the holes in the vessel 68 in which the photo-devices 14 and 16 are cemented. Further, the opposing ends of the support rod 65 are cupped for receiving therein the lens portions of the respective photo-devices 14 and 16. The support rod 65 is constructed of two parts, with the mask 62 held therebetween by an adhesive or other suitable bonding agent. The mask 62 is constructed of an opaque Noryl type of plastic, and includes a radial diameter that is greater than that of the support rod 65. In this manner, the mask 62 blocks the rays of light that could otherwise be transmitted directly from the photo-emitter 14 to the photo-detector 16. The mask 62 is shown to include registration protrusions on opposing faces thereof for fitting into corresponding indentions in the ends of the rods 65 that are adhered to the mask 62. With this arrangement, the mask 62 is axially registered with the rod 65. In the event the mask and/or rod is larger than the holes formed in the opposing sidewalls of the vessel 68, the vessel can be made in halves and cemented together with the rod/mask arrangement fixed therein.

Figure 6:
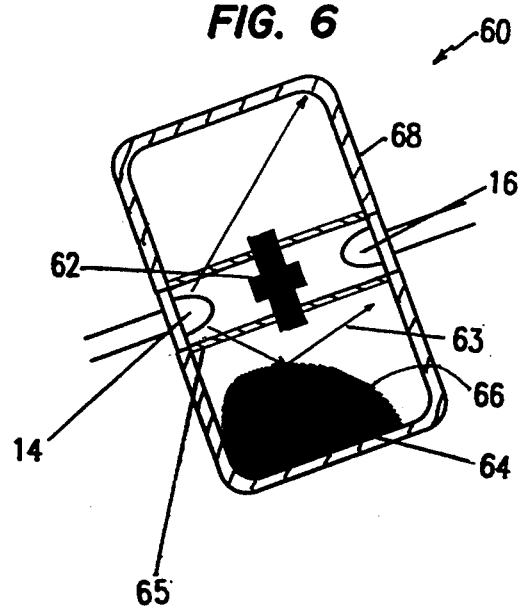
FIG. 6 illustrates the optical pitch sensor of FIG. 5, but inclined at an angle.

In this embodiment, as in the previous embodiment, the surface 66 of the liquid 64 within the vessel 68, under the influence of gravity, remains level while the vessel 68 is tilted. The volume of liquid 64 is chosen to fill the vessel 68 about one fourth the total internal volume thereof so that when at a maximum angle of inclination, the emitter 14 or detector 16 is not immersed in the liquid 64. With no incline (or zero degrees of inclination), the beam of light 63 originating from the emitter 14 is reflected at an angle from the liquid's surface 66 the same as the angle of incidence. This reflected beam 63 is detected by the photo-detector 16 at the opposite end of the sensor 68. When the sensor 60 is tilted, the beam of light 63 from the emitter 14 is reflected with the same angle as the incident beam angle, but is reflected away from the detector 16 at varying sensor inclination angles, thus reducing the total intensity of light reaching the detector's base-collector junction. When the sensor 60 has either a positive or negative inclination, the photo-detector's output voltage amplitude varies as a function of the inclination angle and reaches a maximum value in the horizontal (level) position. FIG. 6 shows a view of the sensor 60 in such an inclined position, when less reflected light reaches the photo-detector 16.

Figure 7:
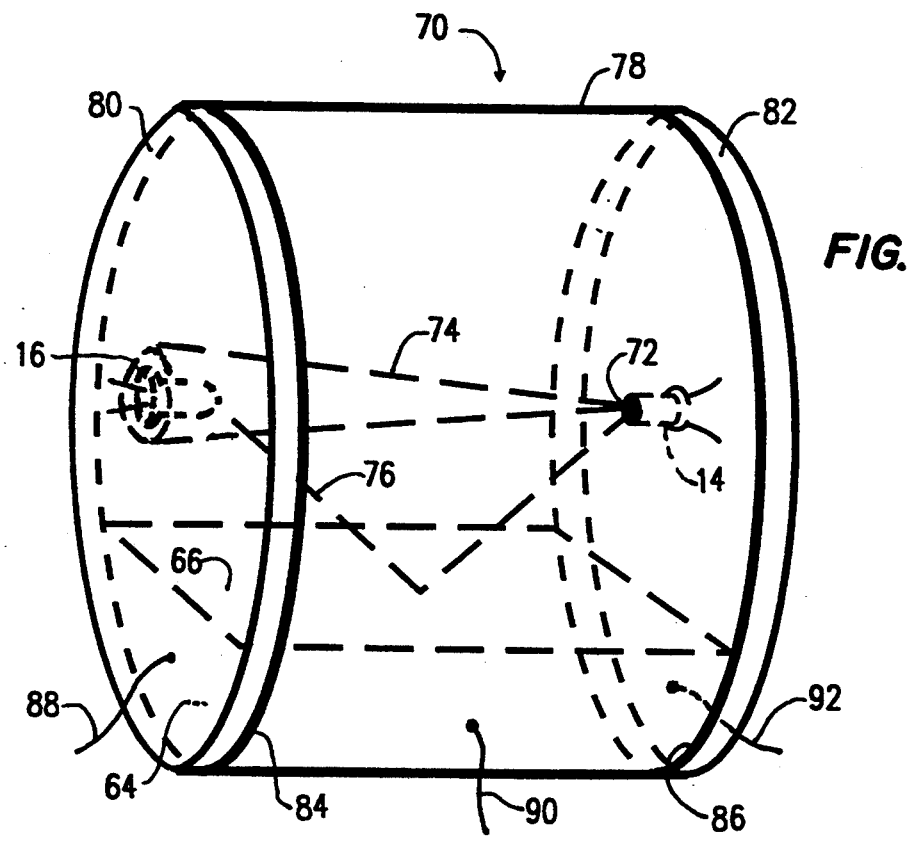
FIG. 7 is another embodiment of the optical pitch sensor of the invention that utilized an opaque mask on the light emitter to prevent direct light from reaching the light detector.

FIG. 7 illustrates an optical pitch sensor much like that shown in FIGS. 5 and 6, but with a mask 72 formed on the frontal portion of the light emitter 14. The mask 72 can comprise an opaque dot painted or otherwise permanently formed on the lens or frontal surface of the light emitter 14. Preferably, the mask 72 comprises indelible paint that does not adversely react with the reflective liquid medium 64. The mask 722 covers the frontal surface of the light emitter 14 to the extent that a shadow cone 74 fully envelopes the light detector 16. The primary purpose of the mask 72 is therefore to prevent direct light from the emitter 14 from reaching the light detector 16, without first having been reflected from the surface 66 of the reflective medium 64, as shown by light ray 76.

Another feature of the invention shown in FIG. 7 is the vessel that is adapted for determining a positive or negative angle of inclination. The vessel includes a cylinder body 78 with opposing end caps 80 and 82. Each end cap 80 and 82 is fixed to the cylinder 78 via a respective insulator 84 and 86. Further, the cylinder body 78, as well as the end caps 80 and 132 are constructed of a conductive material, such as aluminum. With this construction, the conductive end caps 80 and 82 are electrically insulated from the cylinder body 78. Conductors 88, 90 and 92 are connected to the respective end caps and the cylinder body for sensing the positive or negative angle of inclination. In this embodiment, the reflective medium 64 is also conductive, such as mercury. The volume of the conductive liquid 64 is small so that when the vessel is tilted somewhat, the liquid does not touch one of the end caps. When the vessel is tilted about an axis extending through the light emitter 14 and light detector 16, the conductive medium 64 no longer contacts one of the end caps 80 or 82, thereby providing an open circuit between the center conductor 90 and one of the end cap conductors 88 or 92. In other words, if the vessel 78 were tiled such that the light emitter 14 is above the light detector 16, the conductive medium 64 would no longer touch the end cap 82, whereby an open circuit would exist between conductors 90 and 92. However, a short circuit would exist between conductors 88 and 90, as the conductive medium 64 would short circuit the cylinder body 78 to the end cap 80. A positive or negative angle of pitch can thus be determined, while the amount of reflected light reaching the photo-detector accurately determines the extent of inclination.

Figure 8:
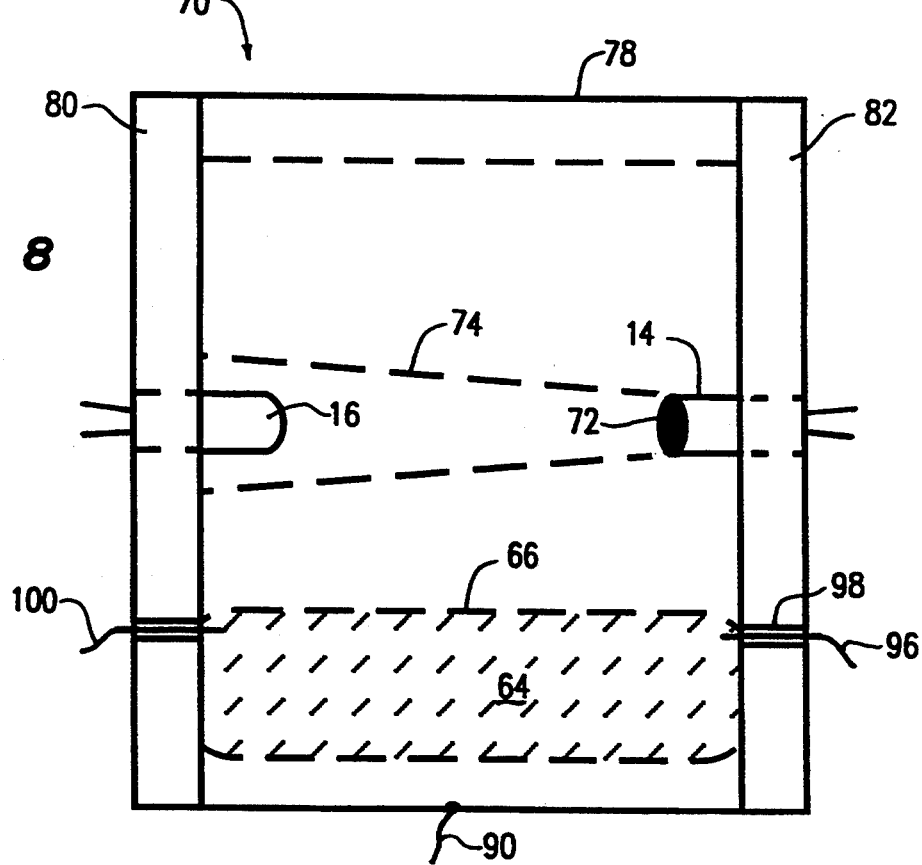
FIG. 8 illustrates an optical sensor vessel structured to provide positive or negative indications of pitch angle, while the light emitter and detector provide accurate indications of the degree of positive or negative angle of pitch.

FIG. 8 shows a slightly different technique for determining the positive or negative angle of inclination of the sensor 70. In this vessel structure, an electrode 96 is insulated from the end cap 82 by an insulator 98, but disposed in a sealed manner through the end cap 82 and protruding internal to the vessel so as to be in contact with the conductive medium 64. The conductor 100 is similarly insulated from the end cap 80, but protrudes into the vessel so as to also be in contact with the conductive medium 64 when the sensor 70 is level. Both conductors 96 and 100 are sealed in the respective end caps 82 and 80, and located at positions therein so as to be near the upper surface of the conductive medium 64 when the sensor 70 is level. Thus, when the sensor 70 tilts about an axis extending through the light emitter and detector elements 14 and 16, one of the conductors 96 or 100 will not touch the conductive medium 64, thereby providing an open circuit with respect to the common conductor 90. Depending on whether there is an open circuit between the conductors 96 and 90, or between conductors 100 and 90, it can be determined whether there exists a positive or negative pitch angle. Of course, the magnitude of voltage provided at the output of the light detector 16 determines the precise angle of pitch. Circuits for providing analog output voltages corresponding to the pitch angles of the sensor of FIG. 7 can be as shown in FIG. 4. With regard to the vessel of FIG. 8, it is not necessary that the end caps 80 and 82 be either conductive or electrically isolated from the cylinder body 78, as in the embodiment of FIG. 7. In the event the end caps 80 and 82 are themselves insulators, then the conductors 100 and 96 can be sealed directly within the respective end caps. Further, those skilled in the art may find that positive or negative pitch angles can be determined by using the center conductor 90 and only a single end cap conductor, as an open circuit therebetween may indicate a positive pitch angle and a closed circuit may indicate a negative pitch angle.

As in the previous embodiment, the angle of inclination of this embodiment can be easily measured by using the simple external electronic support circuitry as shown in FIG. 4.

The foregoing illustrates the principles and the concepts of the invention when utilizing the refractive or reflective properties of light in conjunction with the medium that interacts in some manner with the light. To that end, the invention is not limited to light as the type of energy transferred between a transmitter and a receiver of a pitch sensor. Indeed, audible, ultrasonic vibrations and other energy waves susceptible to changes due to refraction or reflection can be utilized in the manner noted above. Also, beta and alpha particle sources and receivers can be utilized with a magnetic-based fluid to determine angles of orientation. The scope of the invention is thus not limited to light, whether visible or invisible as disclosed above in connection with the preferred and alternate embodiments. Thus, while the preferred and other embodiments of the invention have been disclosed with reference to specific light-operated sensors, it is to be understood that many changes in detail may be made as a matter of engineering choices, without departing from the spirit and scope of the invention as defined by the appended claims.

What is claimed is:

1. An angle sensor adapted for 360 degrees rotation about an axis to provide output indications of angles between a reference axis and the axis of rotation, comprising:

a transmitter located on the axis of rotation for transmitting energy;

a small area receiver located on the axis of rotation for receiving the energy transmitted thereto from the transmitter;

said transmitter and said receiver being immovable with respect to said sensor;

a medium that is movable with respect to said sensor, said medium being operative to change a characteristic of the transmitted energy in an amount corresponding to the angular movement of the sensor between the reference axis and the axis of rotation, before the transmitted energy reaches the receiver; and said receiver providing the output indications of the extent of angular orientations of the sensor between the axis of rotation and the reference axis, and being independent of the rotational orientation of the sensor.

2. The angle sensor of claim 1, wherein said medium comprises a liquid.

3. The angle sensor of claim 2, wherein said energy comprises light energy, and said liquid changes an angle of reflection of the light energy between the transmitter and the receiver.

4. The angle sensor of claim 2, wherein said energy comprises light, and said liquid changes an angle of refraction of the light energy between the transmitter and the receiver.

5. The angle sensor of claim 3, wherein said medium comprises mercury for reflecting light energy from the transmitter to the receiver.

6. The angle sensor of claim 5, further including an opaque mask disposed between said transmitter and said receiver for preventing direct illumination of the receiver by the light energy transmitted by the transmitter.

7. The angle sensor of claim 6, further including a container for containing the mercury and for supporting the transmitter and the receiver, and wherein an inside surface the container is absorptive to a wavelength of light to which the receiver is responsive.

8. The angle sensor of claim 1, wherein said medium comprises a liquid, and further including a container for containing the liquid and supporting the transmitter and receiver in alignment with the axis about which said container can be rotated, thereby providing angular measurements of the sensor with respect to the axis of rotation.

9. The angle sensor of claim 8, wherein said transmitter and said receiver are mounted in alignment with a horizontal axis through said container.

10. The angle sensor of claim 4, further including a container for containing the liquid and for supporting one of the transmitter or receiver in the liquid and for supporting the other of the transmitter or receiver out of the liquid, whereby the light energy transmitted by the transmitter is refracted by a boundary surface of the liquid before being received by the receiver.

11. The angle sensor of claim 1, further including a vessel for containing a medium that is electrically conductive, and including means responsive to a pitch of the vessel for conducting electrical currents and providing a positive or a negative indication of pitch, and wherein said receiver provides an extent of the positive or negative pitch angle.

12. An angle sensor adapted for 360 degrees rotation about an axis to provide output indications of angles between a reference axis and an axis about which said angle sensor rotates, comprising:

a vessel for containing a fluid, said vessel having opposing end walls through which the axis of rotation passes;

an optical emitter for emitting energy and an optical detector for detecting the energy, each fixed to a respective said end wall of the vessel where said axis of rotation passes therethrough, and for movement thereof with the vessel; and said fluid filling the vessel less than full and having a boundary surface for modifying an intensity characteristic of the energy in correspondence with angular orientation of the sensor with respect to the reference axis, whereby said detector detects the energy characteristics and produces an output corresponding to the angular orientation of the sensor and is independent of the rotational orientation of the angle sensor.

13. The angle sensor of claim 12, wherein said fluid comprises a liquid that refracts the emitted energy at an angle in correspondence with the angular orientation of the sensor.

14. The angle sensor of claim 13, wherein said optical emitter is emersed in said liquid and said optical detector is not emersed in said liquid.

15. The angle sensor of claim 13, wherein said optical emitter and said optical detector each include a lens for focusing the energy therebetween.

16. The angle sensor of claim 12, wherein said optical emitter and said optical detector comprise respectively a light emitting diode and a phototransistor having a small area responsive to the light emitted from the light emitting diode.

17. An angle sensor adapted for rotation about an axis and providing output indications of angular orientations with respect to a reference, comprising:

a vessel for containing a fluid, said vessel having a cylindrical shape for rotating about the axis, and having end caps fastened to the vessel for providing an enclosure;

an optical emitter for emitting energy and an optical detector for detecting the energy, each fixed to a respective said end cap of said vessel in alignment with said axis for rotational movement thereof with the vessel; and said fluid being of the type for reflecting the emitted energy from the emitter and received by the detector in an intensity corresponding to an angular orientation of the vessel between the reference and the axis of rotation, whereby the detector produces a continuous angle output that changes only with a change in an angle between the reference and the rotational axis of the vessel, and is independent of the rotational position of the angle sensor.

18. The angle sensor of claim 17, wherein said fluid comprises mercury.

19. The angle sensor of claim 17, further including an opaque mask for preventing direct transfer of the emitted energy from the optical emitter to the optical detector, except by way of reflection from the fluid.

20. The angle sensor of claim 19, further including a support for supporting said mask between said optical emitter and said optical detector.

21. The angle sensor of claim 20, wherein said support comprises a rod constructed of a material transparent to the emitted energy, said rod extending between the optical emitter and the optical detector for supporting the mask.

22. The angle sensor of claim 17, wherein said optical emitter and said optical detector are both disposed above a boundary surface of the fluid when said angle sensor is oriented with no inclination angle with respect to the reference.

23. The angle sensor of claim 19, wherein said mask comprises an opaque paint on a surface of the optical emitter.

24. The angle sensor of claim 18, further including at least two conductors responsive to the orientation of the mercury within the vessel for providing a positive or negative angle of pitch of the angle sensor.

25. The angle sensor of claim 17, wherein said optical emitter and said optical detector comprise respectively a light emitting diode and a phototransistor having a small area responsive to the light emitted from the light emitting diode.

* * * * *